United States Patent [19]

Kauffman

[11] 4,217,593
[45] Aug. 12, 1980

[54] WATER DEPTH-LORAN POSITION RECORDER

[76] Inventor: Ray B. Kauffman, 3876 N. Landing Rd., Virginia Beach, Va. 23456

[21] Appl. No.: 19,751

[22] Filed: Mar. 12, 1979

[51] Int. Cl.² .............................................. G01D 9/28
[52] U.S. Cl. ..................................... 346/62; 346/33 C
[58] Field of Search .............. 346/33 B, 33 C, 33 EC, 346/62

[56] References Cited
U.S. PATENT DOCUMENTS

| | | | |
|---|---|---|---|
| 3,274,608 | 9/1966 | Ewing et al. | 346/33 C |
| 3,803,629 | 4/1974 | Walsh et al. | 346/62 X |
| 3,886,526 | 5/1975 | Smith | 346/33 C X |
| 3,949,408 | 4/1976 | Mason et al. | 346/62 |
| 4,020,447 | 4/1977 | Michon et al. | 346/33 C X |

Primary Examiner—George H. Miller, Jr.
Attorney, Agent, or Firm—Donald A. Kettlestrings

[57] ABSTRACT

Apparatus, for use with a chart recording fathometer, for receiving loran C time difference/line of position information and for recording that information in vertical columns on the chart in juxtaposition with water depth information from the fathometer. The apparatus requires no modifications to conventional recording fathometers and is simply electrically connected to the fathometer's transducer.

23 Claims, 4 Drawing Figures

INPUT DATA FROM LORAN C SET

WATER DEPTH-LORAN POSITION RECORDER

This invention relates to information recording apparatus and more particularly to an electrical system for use with a chart recording fathometer for receiving loran C time difference/line of position information and for recording that information on the fathometer chart with water depth information from the fathometer. This invention also contemplates the recording of other than loran C information on the chart in juxtaposition with water depth information, for example, vessel heading information, water temperature information, water salinity information, water flow information, etc.

Commercial fishermen have for many years used recording fathometers to observe the ocean bottom, to locate desirable fishing areas and to assist in locating schools of fish. Commercial fishermen and others have also used loran C sets to provide them with navigational position information accurate to within a few hundred feet. There has long been a need to relate the loran C position information to the water depth information obtained from the shipboard fathometer so that the exact position of favorable bottom features can be recorded. This would enable the fishermen to easily find and return to the favorable areas again and again. Heretofore, there has been no way for fishermen to simultaneously record water depth information and loran C position information on the same chart. This invention fulfills this need and provides an easily readable printout of loran C position information in juxtaposition with water depth information on the fathometer recording chart. The invention accomplishes this without requiring any internal alterations or modifications to the fathometer.

It is, therefore, an object of the present invention to provide electrical apparatus for use with a chart recording fathometer for receiving and recording loran C position information on the chart with water depth information obtained from the fathometer.

Another object is to provide such an electrical apparatus which can be easily attached to the fathometer's transducer without requiring modifications or alterations to the fathometer itself.

A further object of the invention is the provision of such apparatus which utilizes the fathometer chart recorder's stylus to transcribe the loran position information directly onto the fathometer chart paper.

Still another object is to provide such apparatus wherein the loran position information is recorded on the fathometer chart in vertical columns.

Yet another object of the present invention is the provision of such apparatus wherein the location of the loran position information on the fathometer chart can be adjusted.

A still further object of the present invention is to provide such apparatus wherein the loran position information is recorded on the fathometer chart in the form of printed numerical characters, letters and/or symbols.

Another object of the invention is to provide such apparatus wherein the size of the printed numerical characters, letters or symbols can be adjusted.

A further object of the invention is the provision of such apparatus wherein the frequency with which the columns of loran position information are recorded on said fathometer recording chart can be varied.

Another object of the present invention is to provide such apparatus wherein the contrast of the recorded loran position information with respect to the recorder chart can be adjusted.

Still another object of the invention is to provide such apparatus which enables the recording with water depth information of other information, such as vessel heading information, water temperature information, water salinity information, water flow information, etc.

Additional objects and advantages of the invention will be set forth in part in the description which follows, and in part will be obvious from the description, or may be learned by practice of the invention. The objects and advantages are realized and attained by means of the instrumentalities and combinations particularly pointed out in the appended claims.

To achieve these and other objects the present invention provides apparatus for use with a chart recording fathometer for receiving information of a predetermined type and for recording the information on the chart with water depth information from the fathometer, the apparatus including first means for receiving predetermined type information, means in operative relationship with the receiving means for storing the predetermined type information and means in operative relationship with the storing means and with the fathometer for enabling the recording of the information of a predetermined type on the chart with the water depth information.

In accordance with the invention, second receiving means are connected in electrical circuit relationship for receiving transducer transmit pulses from the fathometer, and first electrical circuit means are connected in circuit relationship with the second receiving means and in operative relationship with the fathometer recorder for enabling the recording of the information of a predetermined type on the fathometer recording chart in vertical columns and in juxtaposition with the water depth information.

This invention provides for a unique system which accomplishes the desired result of recording loran position information or other information in juxtaposition with the water depth information on the fathometer chart and without the need for modifying or altering the conventional fathometer. The apparatus of this invention is easily connected to the fathometer transducer terminal, and no alterations to the conventional fathometer are needed.

It is to be understood that both the foregoing general description and the following detailed description are exemplary and explanatory, but are not restrictive of the invention.

The accompanying drawings, which are incorporated in and constitute a part of this specification, illustrate an example of a preferred embodiment of the invention and, together with the description, serve to explain the principles of the invention.

Figure 1:
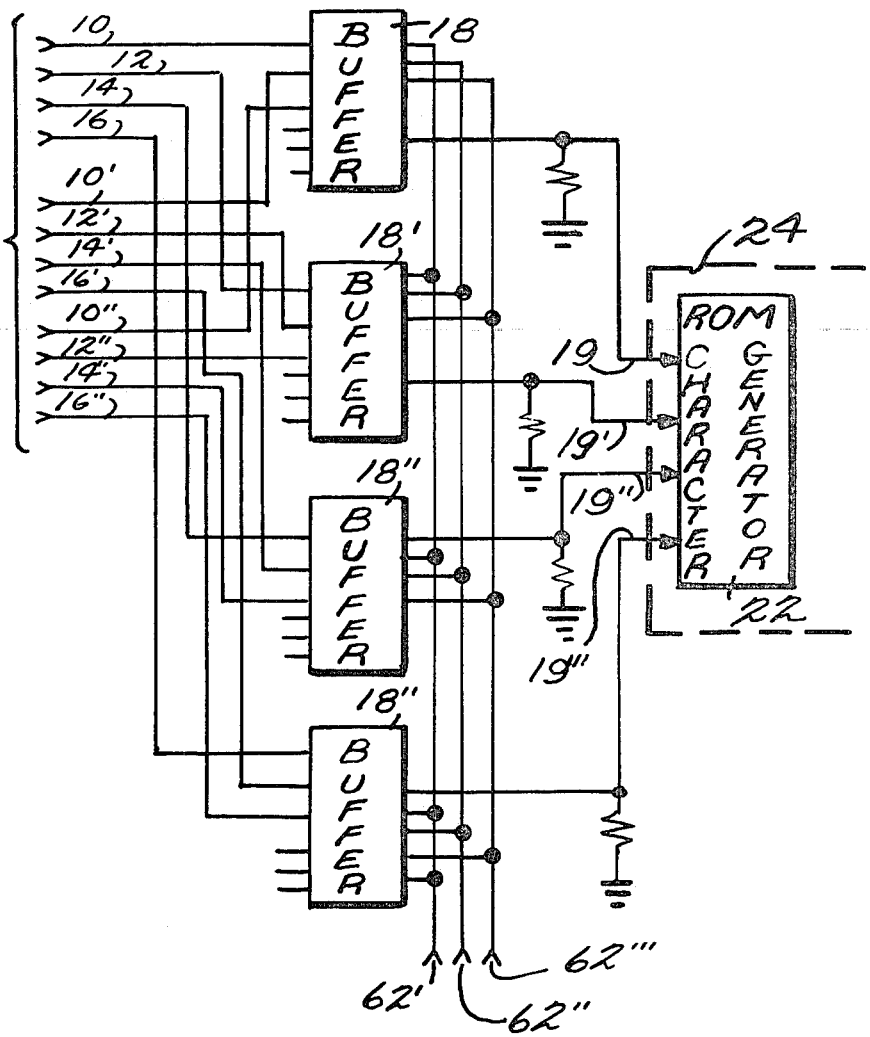
FIG. 1 is a block diagram of a portion of the invention showing the input of loran position information or other information.

With reference now to the drawings, wherein like reference characters designate like or corresponding parts throughout the several views, there is shown in FIG. 1 a plurality of inputs 10, 12, 14 and 16 from a conventional loran C set. In accordance with this invention, these inputs could also be connected to receive other types of input data. For example, vessel heading information, water temperature information, water salinity information or water flow information could be provided via these or similar inputs.

The normal form of output data from commercially available loran C sets is in serial data form, and the data outputs are available at the back of the loran sets, usually from a standard connector. This serial data is fed into the apparatus of this invention via inputs or first means 10, 12, 14, 16 for receiving the loran position information and/or data.

Storing means or buffers 18 are provided in operative relationship with first receiving means 10, 12, 14, and 16 for storing the loran C position information. The loran C position information, in serial format, is converted by buffers 18 into a parallel data format and this parallel data is then converted into the proper time sequence by multiplexer 20 to operate read only memory character generator 22. Buffers 18, character generator 22 and all other elements and integrated circuits of this invention are available commercially. One example of a read only memory (ROM) character generator that could be used is Fairchild Semiconductor Corporation No. 3257, 64×5×7 dot matrix character generator. One example of buffers 18 or multiplexer 20 that could be used is RCA part number CD 4051.

Figure 2A:
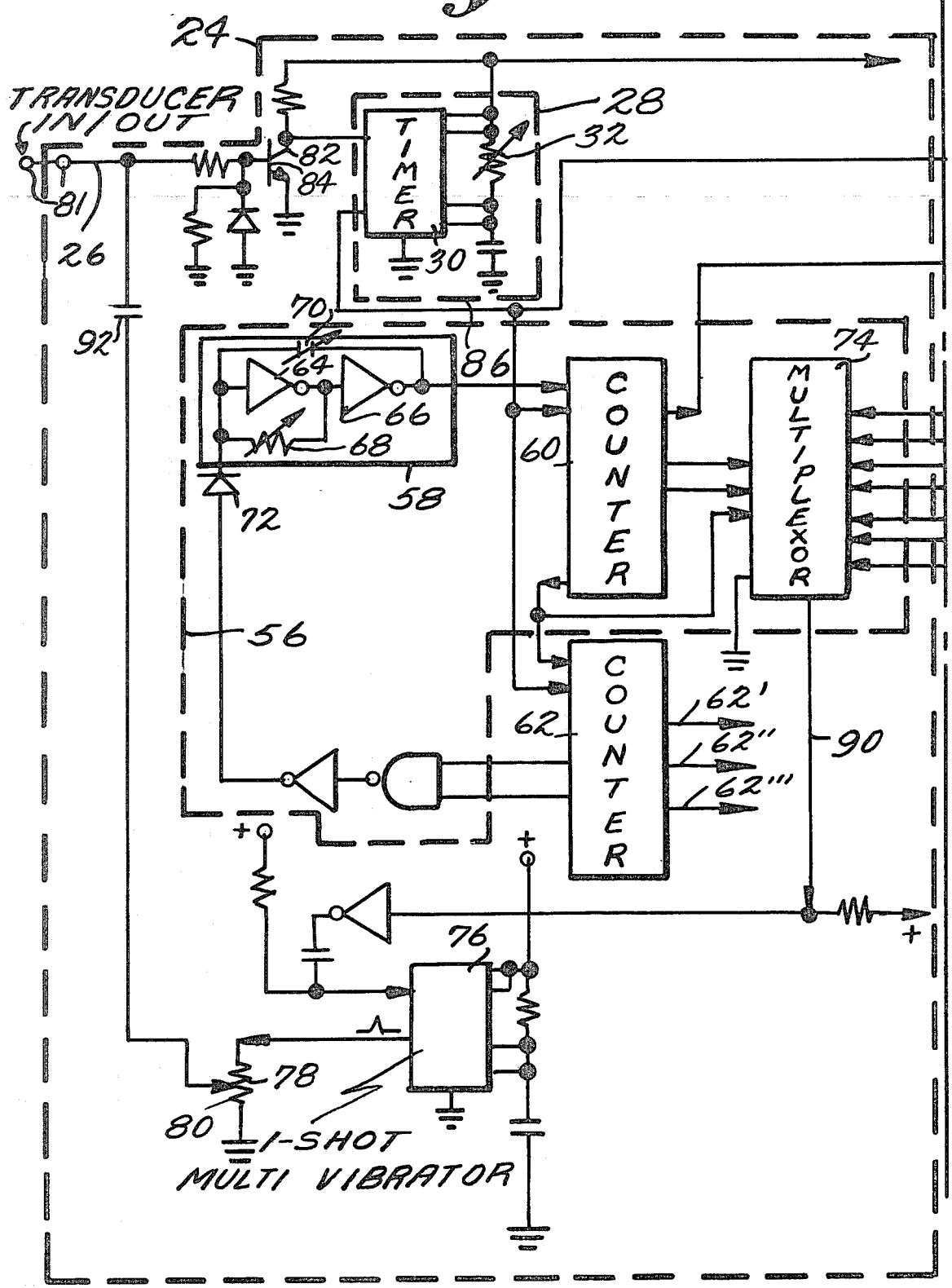
FIGS. 2A and 2B are block diagrams of another part of the invention illustrating the connection to the fathometer transducer.
Figure 2B:
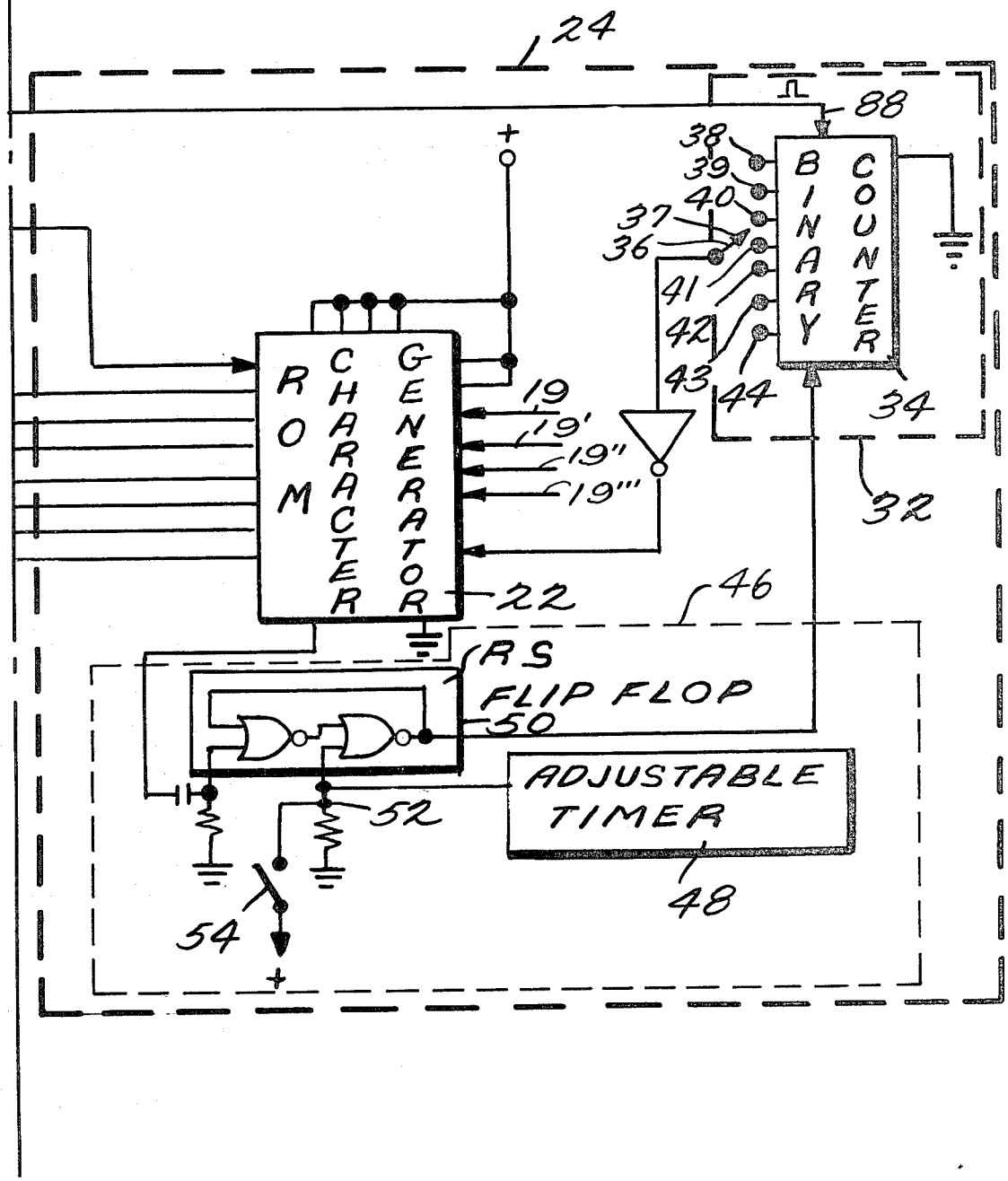

Character generator 22 is part of a larger system or means 24 in operative relationship with storing means 18 and with the fathometer for enabling the recording of the loran C position information on the fathometer chart with water depth information. This enabling means or system 24 is illustrated more completely in FIGS. 2A and 2B.

Enabling means or system 24 includes a second receiving means or electrical connector 26 in electrical circuit relationship for receiving transducer transmit pulses from the fathometer transducer (not shown). The remaining elements of system 24 include first electrical circuit means 24 connected in electrical circuit relationship with connector 26 and in operative relationship with the fathometer recorder (not shown) for enabling the recording of the loran position information on the fathometer recorder chart in juxtaposition with the water depth information.

Figure 3:
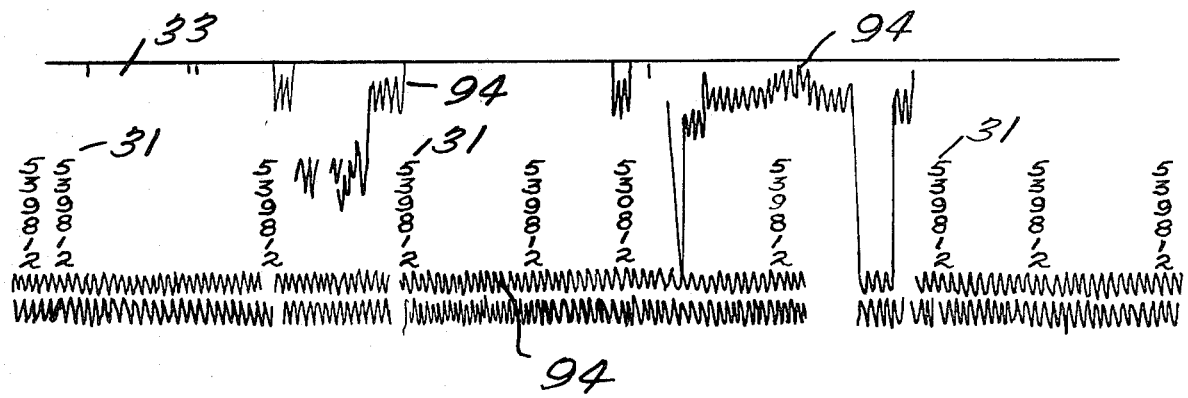
FIG. 3 is a representative illustration of a fathometer recording chart with water depth and loran position information printed thereon, as provided by this invention.

First electrical circuit means 24 is in operative relationship with the fathometer recorder via the fathometer transducer (not shown) for enabling the recording of the loran position information 31 in vertical columns on the fathometer recorder chart (FIG. 3).

First circuit means 24 includes second circuit means 28 in operative relationship with the fathometer recorder for enabling adjustment of the vertical position on the fathometer recorder chart of the loran C position information. Second circuit means 28 includes a timer or first means 30 in circuit relationship with connector 26 for producing predetermined electrical output signals in response to pulses received from the fathometer transducer via connector 26. Second circuit means 28 further includes a variable electrical resistor 32 connected in circuit with timer 30 for enabling adjustment of the vertical position on the fathometer recorder chart (FIG. 3) of the loran C position information 31.

First circuit means 24 also include third circuit means 32 in operative relationship with the fathometer recorder (not shown) for enabling adjustment of the width of the vertical columns 31 (FIG. 3) of recorded information. More specifically, third circuit means 32 include means 34 in circuit relationship with connector 26 and with timer 30 for counting the number of transducer transmit pulses from the fathometer. Counting means or binary counter 34 is also provided with second means 36 in circuit relationship with counter 34 for enabling production of a predetermined electrical signal from an output of counter 34 after the occurrence of a predetermined number of fathometer transducer transmit pulses. This signal division means 36 includes switch 37 adapted to contact any one of counter output pins 38–44. The input frequency to counter 34 is divided by a factor of 2, 4, 8, 16, 32, 64 or 128 depending upon which of pins 38–44 switch 37 contacts. Counter 34 is commercially available, and one example of such an integrated circuit is RCA part number CD 4024.

Counter 34 counts the output pulses that are transmitted by the fathometer transducer. The fathometer transmits an output pulse every time the fathometer stylus (not shown) moves across the recording chart 33 (FIG. 3). When the division ratio of counter 34 is chosen to be very high, more passes of the stylus will be required to print a column 31 of loran numbers. Since the recording chart paper 33 moves a given increment for each pass of the stylus, more passes of the stylus translate into greater width of the printed columns of loran position information.

First circuit means 24 of this invention further include fourth circuit means 46 in operative relationship with the fathometer recorder (not shown) for enabling adjustment of the horizontal positions on fathometer recorder chart 33 of loran information 31. More specifically, fourth circuit means 46 include adjustable timer or means 48 in operative relationship with the fathometer recorder for controlling the frequency with which the columns 31 of loran information are recorded on the fathometer recorder charts. Specifically, fourth circuit means 46 include an RS flip flop circuit 50 connected in circuit relationship with counter 34, and adjustable timer circuit 48 is connected in circuit relationship with an input 52 of flip flop 50. Switch means 54 are also connected in circuit relationship with input 52 of flip flop 50 and with timer circuit 48 for enabling manual override of the timer circuit to provide for the printing of a column of loran C information whenever desired. The period of timer 48 is preferably adjustable from seconds to twenty or thirty minutes. Switch 54 is used as an operator override (print on command) so that the loran data can be printed on the fathometer chart whenever desired without disturbing the setting of timer 48. Each time that timer 48 is activated or switch 54 is closed, circuit means 24 again prints another column 31 (FIG. 3) of loran data on fathometer chart 33.

Flip flop integrated circuit 50 is also commercially available, and one example of such a circuit is RCA part number CD 4001.

First circuit means 24 of this invention further include fifth circuit means 56 in operative relationship with the fathometer recorder for enabling adjustment of the height of the vertical columns 31 of recorded loran information. More specifically, fifth circuit means 56 include an electrical oscillator 58 and electrical counters 60, 62 connected in circuit relationship with oscillator 58 and with timer 30. Oscillator or master clock 58 is a conventional oscillator composed of two cascaded inverting buffers 64, 66 and the frequency of the oscillator is governed by resistor 68 and by capacitor 70. A diode 72 is also connected between oscillator 58 and counter 62, and the diode serves as a gate to turn off the oscillator or master clock after one column of loran information has been printed on the fathometer recorder chart. An example of counters 60, 62 is RCA integrated circuit part number CD 4024.

First circuit means 24 of this invention also include ROM character generator 22 connected in circuit relationship with storing means 18, with counting means 34 and with flip flop 50. A multiplexer 74 is connected in electrical circuit relationship with counters 60, 62 and with character generator 22, and a one-shot multivibrator 76 is connected in circuit relationship with multiplexer 74 and with connector 26. One example of multiplexer 74 is RCA integrated circuit number CD 4051.

Sixth circuit means 78 is also provided in operative relationship with the fathometer recorder (not shown) for enabling adjustment of the contrast of the recorded loran information with respect to the recorder chart. Specifically, sixth circuit means 78 include a variable electrical resistance 80 connected in circuit relationship between one-shot multivibrator 76 and connector 26.

In operation of the apparatus of this invention, connector 26 is connected to the "hot" wire 81 of the transducer cable of the fathometer. The transmit pulse from the depth sounder (not shown) of the fathometer appears at connector 26, and this momentarily causes collector 82 of transistor 84 to switch rapidly to zero voltage. This triggers "start print position timer" 30 which, in turn, supplies a reset pulse to counters 60 and 62. Variable electrical resistor 32 is provided to enable adjustment and variation of the vertical position of the printed loran data 31 on chart 33.

The reset pulse provided via conductor 86 to counters 60, 62 also sets input 88 of binary counter 34. Immediately after a reset pulse, counters 60, 62 begin counting the pulses from master clock 58. The output of counter 60 drives multiplexer 74 (an eight input to one output multiplexer), and multiplexer 74 receives seven bits of binary parallel input data from character generator 22. These bits of binary parallel input data are then serially multiplexed from output 90 of multiplexer 74 and are fed to one-shot multivibrator 76, which has a very narrow pulse of a few microseconds width.

The output from multivibrator 76 is coupled through capacitor 92 and back to the transducer via connector 26. The extremely narrow pulse width and the fast rise time of the pulse from multivibrator 76 shocks the tuned circuits (not shown) in the fathometer into "ringing" which results in a very small dot being printed on chart paper 33 by the fathometer stylus (not shown) for each pulse received from multivibrator 76. This action is repeated until an entire column 31 of loran position character information from character generator 22 has been transcribed onto the chart paper. A representative printout is illustrated in FIG. 3 wherein columnar loran position information 31 is printed on chart paper 33 in juxtaposition with tracings 94 of the fathometer stylus representing water depth information.

The function of counter 34 is to count the number of passes the stylus has made on the chart paper and to then reset character generator 22 to its initial condition to accept new data from buffers 18. Wider or narrower letters in the columns of loran information can be obtained by changing the division ratio of counter 34.

Switch 37 is the means used by the operator to select the character width. Character height is easily varied by merely changing the rate of master clock 58 by means of resistor 68 and capacitor 70. As the clock rate is slowed, fewer pulses are outputted in any given time period. Because the fathometer's stylus is always moving at a constant rate, the stylus will move farther as the time period is increased. This results in printing the character-forming dots on chart paper 33 farther apart in a vertical direction. Consequently, the letters or characters in the loran position information columns 31 get larger in the vertical direction as the clock rate is slowed.

RS flip flop 50 enables control of the frequency with which the columnar information is printed. When switch 54 is momentarily closed, another column of loran position data will be printed on the chart. In an alternative embodiment of this invention, an adjustable timer circuit 48 is used in addition to switch 54. The period of timer circuit 48 is preferably adjustable from seconds to as much as twenty or thirty minutes. Switch 54, however, is used as an operator override (print on command) so that the columnar loran information can be printed on chart 33 whenever desired without disturbing the setting of timer 48.

Variable resistor 80 is provided at the output of multivibrator 76 to control the intensity of the signal sent back to the recording fathometer, which signal causes the "ringing" of the tuned circuits in the fathometer. A low intensity signal will not mark the chart paper as darkly as a strong signal, and too strong a signal may burn the numbers being printed into a solid black streak on the chart paper, thus rendering them unreadable. Therefore, variable resistor 78 is used to control the intensity of the letters or numbers in the printed columns 31 of loran information.

The apparatus of this invention is effective with any good quality commercial fathometer chart recorder which has enough resolution and a defined bandwidth to print the numbers without smearing. For example, the apparatus of this invention has been successfully operated with the Furuno FE 400 and FE 500 units and with the Sitex HE 30 A unit.

The apparatus of this invention provides a unique method and apparatus for printing loran or other information on a fathometer chart without requiring any internal changes to the fathometer. This is accomplished by the unique means of using a narrow, fast rise-time pulse applied to the transducer input of the fathometer that shock-excites the internally tuned circuits of the fathometer and causes the chart recorder to print a small distinct dot on the chart paper. The printing of the loran information in vertical columns is also advantageous since it takes much less time to print than if the information were printed in horizontal rows.

Through use of this invention, commercial fishermen and others can have permanent records of bottom contours of desirable fishing areas together with loran position information to enable the fishermen to return to these same desirable areas again and again. Of course, information other than loran information can be printed directly onto fathometer recording charts by means of this invention. Vessel heading, water temperature, water salinity and water flow information are examples of other types of information which this invention contemplates. This invention also provides the capability of printing the entire alphabet, digits from zero through nine, and many other symbols on the fathometer chart paper.

The invention in its broader aspects is not limited to the specific details shown and described, and departures may be made from such details without departing from the principles of the invention and without sacrificing its chief advantages.

What is claimed is:

1. Apparatus, for use with a chart recording fathometer, for receiving information of a predetermined type and for recording said information on said chart with water depth information from said fathometer, said apparatus comprising:
   first means for receiving said predetermined type information;
   means in operative relationship with said receiving means for storing said predetermined type information; and
   means in operative relationship with said storing means and with said fathometer for enabling the recording of said information of a predetermined type on said chart with said water depth information;
   said enabling means including second receiving means connected in electrical circuit relationship for receiving transducer transmit pulses from said fathometer, and first electrical circuit means connected in electrical circuit relationship with said second receiving means and in operative relationship with said fathometer recorder for enabling the recording of said information of a predetermined type on said fathometer recorder chart in juxtaposition with said water depth information.

2. Apparatus as in claim 1 wherein said first electrical circuit means is in operative relationship with said fathometer recorder for enabling the recording of said information of a predetermined type on said fathometer recorder chart in vertical columns.

3. Apparatus as in claim 2 wherein said first circuit means further include second circuit means in operative relationship with said fathometer recorder for enabling adjustment of the vertical position on said fathometer recorder chart of said information of a predetermined type.

4. Apparatus as in claim 3 wherein said first circuit means further include third circuit means in operative relationship with said fathometer recorder for enabling adjustment of the width of said vertical columns of recorded information.

5. Apparatus as in claim 4 wherein said first circuit means further include fourth circuit means in operative relationship with said fathometer recorder for enabling adjustment of the horizontal positions on said fathometer recorder chart of said information of a predetermined type.

6. Apparatus as in claim 5 wherein said fourth circuit means include means in operative relationship with said fathometer recorder for controlling the frequency with which said columns of information are recorded on said fathometer recorder chart.

7. Apparatus as in claim 6 wherein said first circuit means further include fifth circuit means in operative relationship with said fathometer recorder for enabling adjustment of the height of said vertical columns of recorded information.

8. Apparatus as in claim 7 wherein said first circuit means further include sixth circuit means in operative relationship with said fathometer recorder for enabling adjustment of the contrast of said recorded information with respect to said recorder chart.

9. Apparatus as in claim 8 wherein said second circuit means include:
   first means in circuit relationship with said second receiving means for producing predetermined electrical output signals in response to said transducer transmit pulses; and
   variable electrical impedance means connected in circuit with said first signal producing means for enabling adjustment of the vertical position on said fathometer recorder chart of said information of a predetermined type.

10. Apparatus as in claim 9 wherein said third circuit means include:
    means in circuit relationship with said second receiving means and with said first signal producing means for counting the number of said transducer transmit pulses; and
    second means in circuit relationship with said counting means for enabling production of a predetermined electrical signal from an output of said counting means after the occurrence of a predetermined number of said transducer transmit pulses.

11. Apparatus as in claim 10 wherein said second signal production enabling means is adjustable to vary the predetermined number of said transducer pulses.

12. Apparatus as in claim 11 wherein said fourth circuit means include:
    an RS flip flop circuit connected in circuit relationship with said counting means; and
    a timer circuit connected in circuit relationship with an input of said flip flop.

13. Apparatus as in claim 12 wherein said timer circuit is adjustable.

14. Apparatus as in claim 13 further including switch means connected in circuit relationship with said flip flop and with said timer circuit for enabling selective manual override of said predetermined type information whenever desired.

15. Apparatus as in claim 14 wherein said fifth circuit means include:
    an electrical oscillator; and
    electrical counters connected in circuit relationship with said oscillator and with said first signal producing means.

16. Apparatus as in claim 15 wherein said first circuit means further include:
    a read only memory character generator connected in electrical circuit relationship with said storing means, said counting means, and said flip flop;
    a multiplexer connected in electrical circuit relationship with said electrical counters and with said character generator; and
    a one-shot multivibrator in circuit relationship with said multiplexer and with said second receiving means.

17. Apparatus as in claim 16 wherein said sixth circuit means include a variable electrical resistance in circuit relationship between said one-shot multivibrator and said second receiving means.

18. Apparatus as in claim 17 wherein said information of a predetermined type is recorded on said chart in the form of printed numerical characters, printed letters and/or printed symbols.

19. Apparatus as in claim 18 wherein said information of a predetermined type is loran C line of position/time difference information.

20. Apparatus as in claim 18 wherein said information of a predetermined type is vessel heading information.

21. Apparatus as in claim 18 wherein said information of a predetermined type is water temperature information.

22. Apparatus as in claim 18 wherein said information of a predetermined type is water salinity information.

23. Apparatus as in claim 18 wherein said information of a predetermined type is water flow information.

* * * * *